US008271866B2

(12) United States Patent
Chen et al.

(10) Patent No.: US 8,271,866 B2
(45) Date of Patent: Sep. 18, 2012

(54) USER-CONTROLLED WEB BROWSER TABLE REDUCTION

(75) Inventors: Yen-Fu Chen, Austin, TX (US); John Hans Handy-Bosma, Cedar Park, TX (US); Nancy Sun, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 10/922,269

(22) Filed: Aug. 19, 2004

(65) Prior Publication Data

US 2006/0041835 A1     Feb. 23, 2006

(51) Int. Cl.
*G06F 17/00* (2006.01)

(52) U.S. Cl. .................................. 715/227; 715/218

(58) Field of Classification Search .................. 715/500, 715/503, 504, 509, 513, 200, 212, 217, 218, 715/227, 234

See application file for complete search history.

(56) References Cited

U.S. PATENT DOCUMENTS

| 5,881,381 | A | 3/1999 | Yamashita et al. |
| 5,978,819 | A * | 11/1999 | Berstis ........................... 715/513 |
| 5,983,268 | A | 11/1999 | Freivald et al. |
| 6,055,327 | A | 4/2000 | Aragon |
| 6,078,914 | A * | 6/2000 | Redfern ............................. 707/3 |
| 6,232,967 | B1 | 5/2001 | Kelley et al. ................... 345/333 |
| 6,236,990 | B1 | 5/2001 | Geller et al. ......................... 707/5 |
| 6,298,342 | B1 | 10/2001 | Graefe et al. ....................... 707/4 |
| 6,356,920 | B1 * | 3/2002 | Vandersluis ................ 715/501.1 |
| 6,373,504 | B1 * | 4/2002 | Nielsen ........................... 715/739 |
| 6,374,273 | B1 | 4/2002 | Webster |
| 6,389,437 | B2 | 5/2002 | Stoub |
| 6,493,748 | B1 * | 12/2002 | Nakayama et al. ............ 709/218 |
| 6,636,862 | B2 | 10/2003 | Lundahl et al. ................ 707/101 |
| 6,691,281 | B1 | 2/2004 | Sorge et al. |
| 6,701,485 | B1 | 3/2004 | Igra et al. |
| 6,725,257 | B1 * | 4/2004 | Cansler et al. ................. 709/219 |
| 6,868,528 | B2 | 3/2005 | Roberts |

(Continued)

OTHER PUBLICATIONS

Xiangyang Liu, Sorting Data in Java, Jul. 25, 2001, The Code Project, <http://www.codeproject.com/java/xyobjectarray.asp>.*

(Continued)

*Primary Examiner* — Adam M Queler
(74) *Attorney, Agent, or Firm* — Yee & Associates, P.C.; Mark C. Vallone

(57) ABSTRACT

The invention that meets the needs identified above is a web browser plug-in or feature comprising a modification program (MP), a configuration program (CP), a table reduction program (TRP), algorithms and rules, that interacts with a web browser to analyze a web page for tables. The analysis consists of interrogating incoming hypertext markup language (HTML) for table structure <table>, <tr>, <th> and <td> tags, and incoming text for delimiters. The configuration program introduces controls into the text for each column and row delimiter that met a criteria for being hideable. In addition, the configuration program introduces controls into the HTML for each column and row tag that met a criteria for being hideable. The configuration program links the controls to a hiding algorithm so that when activated, the appropriate hiding algorithm will act on the row or column associated with the control. The controls are injected before the web browser renders the web page. When the web browser renders the web page, the web browser recognizes and interprets the injected HTML code so that the table may be reduced by the table reduction program.

3 Claims, 3 Drawing Sheets

U.S. PATENT DOCUMENTS

| | | | |
|---|---|---|---|
| 6,907,422 B1 * | 6/2005 | Predovic | 707/2 |
| 6,910,076 B2 * | 6/2005 | Lortz | 709/229 |
| 7,228,504 B2 * | 6/2007 | Jones et al. | 715/749 |
| 7,237,186 B2 | 6/2007 | Androski et al. | |
| 7,275,207 B2 * | 9/2007 | Aureglia et al. | 715/214 |
| 7,350,141 B2 | 3/2008 | Kotler et al. | |
| 7,546,523 B2 * | 6/2009 | Aureglia et al. | 715/218 |
| 7,594,165 B2 | 9/2009 | Chen et al. | |
| 2002/0036662 A1 | 3/2002 | Gauthier et al. | |
| 2002/0116417 A1 * | 8/2002 | Weinberg et al. | 707/517 |
| 2004/0167906 A1 | 8/2004 | Smith et al. | |
| 2004/0172592 A1 | 9/2004 | Collie et al. | |
| 2002/0178183 A1 | 10/2004 | Kotler et al. | |
| 2004/0205521 A1 | 10/2004 | Geuss et al. | |
| 2004/0205644 A1 | 10/2004 | Shaughnessy et al. | |

OTHER PUBLICATIONS

USPTO office action for U.S. Appl. No. 11/032,847 dated Dec. 8, 2006.

USPTO final office action for U.S. Appl. No. 11/032,847 dated May 7, 2007.

USPTO office action for U.S. Appl. No. 11/032,847 dated Feb. 25, 2008.

USPTO final office action for U.S. Appl. No. 11/032,847 dated Jul. 24, 2008.

USPTO Notice of allowance for U.S. Appl. No. 11/032,847 dated May 15, 2009.

* cited by examiner

USER-CONTROLLED WEB BROWSER TABLE REDUCTION

CROSS-REFERENCE TO RELATED APPLICATION

The present invention is related to the subject matter of U.S. patent application Ser. No. 10/922,244, incorporated herein by reference.

FIELD OF THE INVENTION

This invention relates generally to computer implemented data processing in general, and more particularly, to a program for reducing a table by hiding columns and rows on a web page.

BACKGROUND OF THE INVENTION

Digital information displayed on the Internet may be found on web pages viewed through a web browser. A web page is an HTML file containing both text and a set of hyper-text markup language (HTML) tags that describe how the text should be formatted when the web browser displays the web page on a user's display screen. A web browser is a computer program that goes to a web server on the Internet, requests the web page, and retrieves the page so that a user can view HTML documents and access files and programs related to those HTML documents. A web server is a program that uses HTTP to provide HTML documents and files and programs related to those documents when requested by a web browser. The web browser then interprets the HTML tags within the page and displays the page.

The HTML tags direct the browser as to how the web page should look when it is displayed. The browser interprets these tags to determine the format of the text on the screen. The tags can instruct the browser to change fonts, color, and arrange text in tables. Currently, one of the most widely used HTML tools for arranged web pages is a table. Tables are created with the tag, <table>. A horizontal row in a table begins with the tag <tr>, and each piece of data within the horizontoal row begins with the tag <td> and <th>. The width of rows and columns, the height of rows and columns, the heading spacing, and the cell spacing in a table can be controlled.

When using a table in a web page, a situation arises where the user may desire to reduce the size of the table. For example, a table on a web page may display a comparison of computer manufacturers, models, prices, central processing unit (CPU), random access memory (RAM), disk space, optical drive specifications, a link to additional information, software installed, warranty, and other many other details. A person shopping for computers on the Internet may access and view the table. However, all of this information will not fit on the user's display. Accessing the data requires horizontal scrolling because the page has left-hand navigation and aggregate column width stretches beyond the user's screen. Moreover, the user only wants to see manufacturer, price, CPU, RAM, and disk space. A reduction in table size to include only the needed items is desirable.

Presently, the problem may be partially alleviated in two ways. First, the user can attempt to add display space through one or more of the following: increase screen resolution, alter the browser layout by removing or consolidating toolbars, remove the status bar, and override the web page layout with a smaller font size. The user could also buy a larger display or a secondary display. Such solutions are expensive and inconvenient, and cannot help in all situations.

Second, web page or application developers could decrease the number of columns that are displayed per page. Alternatively, the number of rows for each item could be increased, shifting information from some columns into sub-rows. The horizontal plane could be dedicated exclusively to the table, giving up navigation or content on the left or right side of the screen. Additionally, developers could provide dynamic column layout and allow the user to set preferences for which columns are displayed. Such preferences could be extended to width and font size. One method that is occasionally used is to provide the data for columns in a persistent data store, with columns displayed or not displayed based on Javascript. (see the Javscript Cookbook by O'Reilly).

None of the developer's solutions are practical or effective. Decreasing columns may help some users to the detriment of others. Increasing the number of rows per item requires more eye movement to gather information. Dedicating the horizontal plane may not fit with site design, may cause usability problems, and may be insufficient in the end. Developing dynamic content would be helpful for users, but would require tracking user's preferences, and may turn away users, all of which making the solution costly and difficult to maintain. Furthermore, such dynamic content would not be accessible to user's with Javascript disabled, involves browser dependencies, and is not compatible with existing web pages that contain table data.

Therefore, what is needed is a system that functions through a browser or browser plug-in that empowers a user to reduce tables by hiding columns on any web page, regardless of the coder's implementation.

These and other objects of the invention will be apparent to those skilled in the art from the following detailed description of a preferred embodiment of the invention.

SUMMARY OF THE INVENTION

The invention that meets the needs identified above is a web browser plug-in or feature comprising a modification program (MP), a configuration program (CP), a table reduction program (TRP), algorithms and rules, that interacts with a web browser to analyze a web page for tables. The analysis consists of interrogating incoming hypertext markup language (HTML) for table structure <table>, <tr>, <th> and <td> tags, and incoming text for delimiters. The analysis further consists of marking all <th>, <td>, and <tr> tags as potentially hideable, and all delimiters for table columns or rows as potentially hidable. If there are two or more contiguous <th> or <td> tags they are marked as hideable. If there are two or more contiguous <tr> tags, all are marked as hideable since the rows may represent the headers. Even if they aren't headers, it allows the user to eliminate items they don't care about. The analysis concludes by determining whether the marked tags and/or marked delimeters meet a criteria for being hideable. Next, the configuration program introduces controls into the text for each column and row delimeter that met the criteria for being hideable. In addition, the configuration program introduces controls into the HTML for each column and row tag that met the criteria for being hideable. The configuration program links the controls to a hiding algorithm so that when activated, the appropriate hiding algorithm will act on the row or column associated with the control. The controls are injected before the web browser renders the web page. When the web browser renders the web page, the web browser recognizes and interprets the injected HTML code so that the table may be reduced by the table reduction program.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention.

As used herein, "computer" means a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, "control" means an object on a screen that, when activated by a user, performs an action.

As used herein, "delimeter" means a character used to indicate the beginning and end of a charcter string.

As used herein, "screen" means a user display device upon which a page may be displayed.

As used herein, "tag" means a code identifying an element in a document so that information in the document may be formatted, indexed and linked As used herein "web browser" means a program that enables a user to access a web page or other HTML document, file, and program related to the web page or other HTML document.

As used herein, "web page" means a Hypertext Markup Language (HTML) file including graphics and/or script in a unique directory identifiable by a uniform resource locator.

As used herein, "wizard" means a utility within an application that interacts with a user in order to guide the user through completion of each step of a task.

Figure 1:
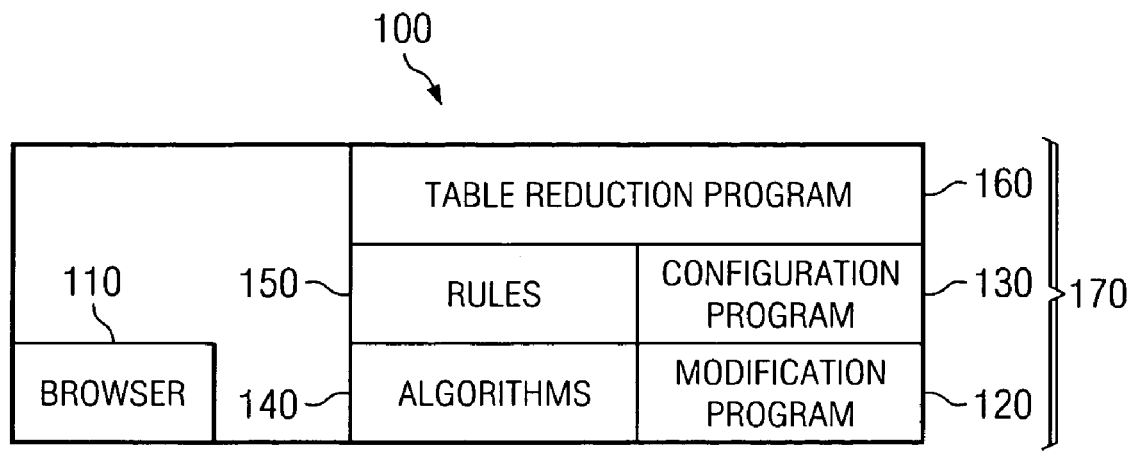
FIG. 1 is a diagram illustrating one embodiment of the internal configuration of a computer.

The internal configuration of a computer, including connection and orientation of the processor, memory, and input/output devices, is well known in the art. FIG. 1 represents the internal configuration of a computer having the computer program of the present invention loaded into memory 100. The computer program of the present invention is depicted as modification program (MP) 120, configuration program (CP) 130, table reduction program (TRP) 160, algorithms 140 and rules 150. Memory 100 also contains browser 110. Memory 100 is only illustrative of memory within a computer and is not meant as a limitation.

The computer is connected to one or more input devices and a display, a user can selectively view the data that is managed by modification program (MP) 120, configuration program (CP) 130, table reduction program (TRP) 160, algorithms 140 and rules 150. The input device may be a keyboard, mouse, rollerball, tackpad, pen, touch screen and stylus, or voice recognition system. The input device may also be a touch screen associated with the display. Together these elements may be embodied as a variety of computing devices such as a personal digital assistant, cellular telephone, notebook computer, and so forth. In alternative embodiments, modification program (MP) 120, configuration program (CP) 130, table reduction program (TRP) 160, algorithms 140 and rules 150 and their components can be stored in the memory of other computers.

Figure 2:
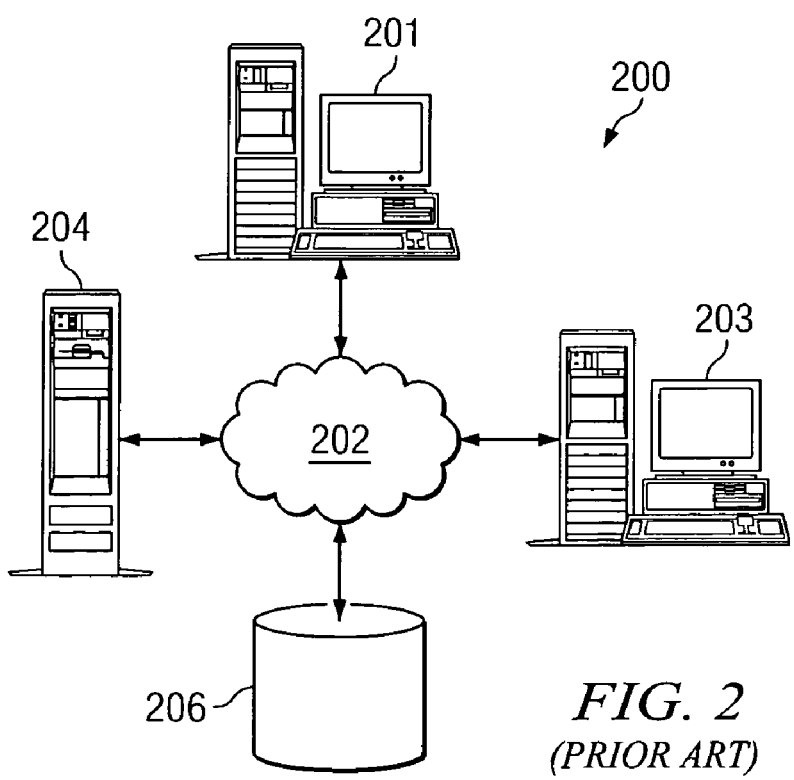
FIG. 2 illustrates an architecture for connecting various hardware devices to create a network for transferring data.

FIG. 2 illustrates a common prior art architecture for connecting various hardware devices to create a network for transferring data. Computer network 200 comprises local workstation 201 electrically coupled to network connection 202. In FIG. 2, local workstation 201 is coupled electrically to remote workstation 203 via network connection 202. Local workstation 201 also is coupled electrically to server 204 and persistent storage 206 via network connection 202. Network connection 202 may be a simple local area network (LAN) or may be a larger wide area network (WAN), such as the Internet. While computer network 200 depicted in FIG. 2 is intended to represent a possible network architecture, it is not intended to represent an architectural limitation.

Modification program (MP) 120, configuration program (CP) 130, table reduction program (TRP) 160, algorithms 140 and rules 150 described herein can be stored within memory 100 of any workstation or server depicted in FIG. 2. Alternatively, modification program (MP) 120, configuration program (CP) 130, table reduction program (TRP) 160, algorithms 140 and rules 150 can be stored in an external storage device such as persistent storage 206, or a removable disk such as a CD-ROM (not pictured). Additionally, browser 110 is generally loaded into the memory of more than one computer of FIG. 2 to enable users on different computers to exchange messages over network connection 202.

Figure 3:
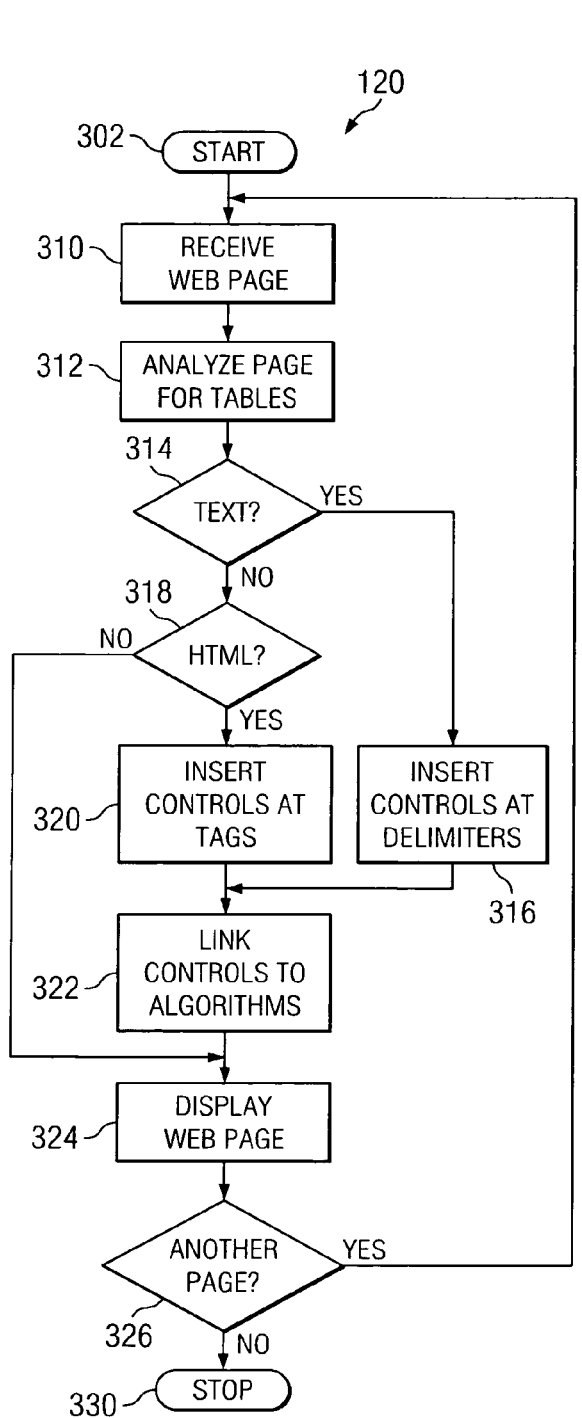
FIG. 3 is a flowchart of the Modification Program (MP).

FIG. 3 illustrates a flowchart of Modification Program (MP) 120. MP 120 begins and receives a web page (310). MP 120 analyzes the web page code looking for tables (312). The analysis consists of interrogating incoming hypertext markup language (HTME) for table structure <table>, <tr>, <th> and <td> tags, and incoming text for delimiters. The analysis further consists of marking all <th>, <td>, and <tr> tags as potentially hideable, and all delimiters for table columns or rows as potentially hideable. The analysis concludes by determining whether the marked tags and/or marked delimeters meet a preestablished criteria for being hideable. In the preferred embodiment, if there are two or more contiguous <th> or <td> tags they are marked as hideable. Also in the preferred embodiment, if there are two or more contiguous <tr> tags, all are marked as hideable since the rows may represent the headers. Likewise, two or more contiguous delimiters are marked as hideable. If MP 120 finds code indicating a table, then MP 120 determines whether the code represents text (314). If the code represents text, MP 120 inserts controls at the delimeters according to rules 150 (316) and MP 120 goes to step 322. If the code does not represent text, MP 120 determines whether the code is HTML (318). If the code is not HTML, MP 120 goes to step 324. If the code is HTML, MP 120 inserts controls at the table tags according to rules 150 (320). The controls that have been inserted in the web page, whether in text or in HTML, are then linked to corresponding algorithms pursuant to configuration program 130 (See FIG. 4) 322. MP 120 displays the web page (324). MP 120 determines whether there is another web page (326). If so, MP 120 goes to step 310. If not, MP 120 ends (330). The controls are injected before the web browser renders the web page. When the web browser renders the web page, the web browser recognizes and interprets the injected HTML code so that the table may be reduced by table reduction program 160.

Figure 4:
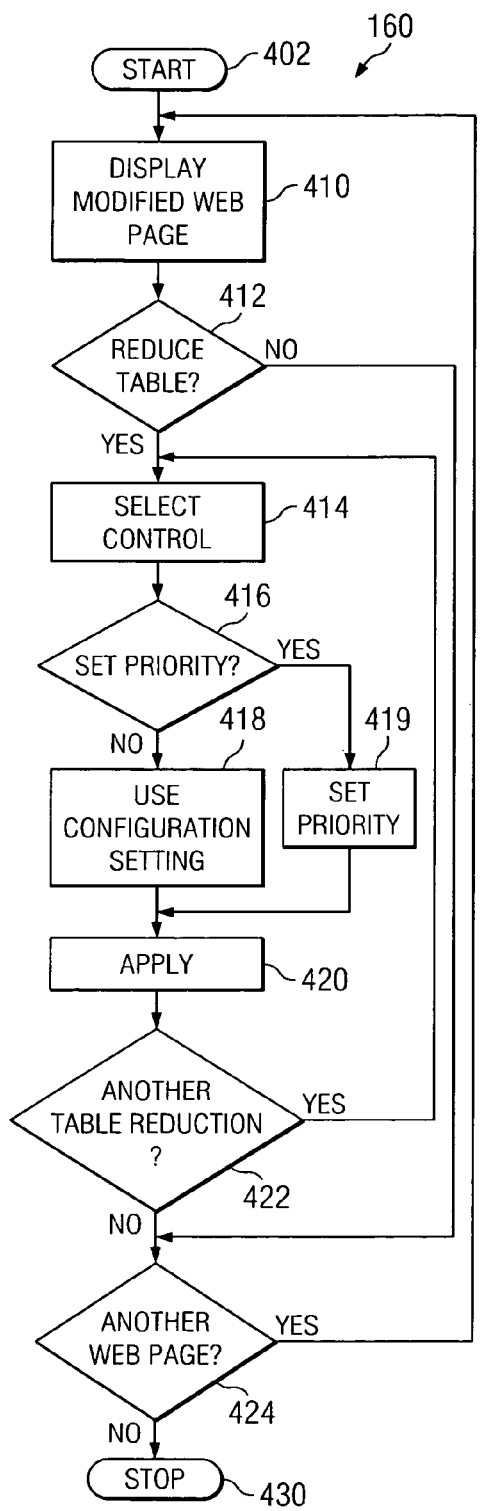
FIG. 4 is a flowchart of the Table Reduction Program (TRP).

FIG. 4 is a flow chart of table reduction program (TRP) 160. TRP 160 begins (402) and displays the modified web page (410) (see 324, FIG. 3). TRP 160 determines whether the user wants to perform a table reduction operation (412). If the user does not want to peform a table reduction operation, TRP 160 goes to step 424. If the user wants to perform a table reduction operation, the user is prompted to select a control (414). TRP 160 determines whether the user wants to set a priority (416). If the user wants to select a priority, the user is prompted to make the selection to set the priority (419) and the selection is applied (420). The priority selection controls the priority in which columns are hidden.

If the user does not want to select a priority, TRP 160 uses the configuration setting (418) and applies the configuration setting (420). A determination is made whether the user wants to perform another table reduction operation (422). If the user wants to perform another table reduction operation, TRP 160 goes to step 414. If not, TRP 160 determines whether there is another web page to display (424). If there is another web page to display, TRP 160 goes to step 410. If not, TRP 160 stops (430).

Figure 5:
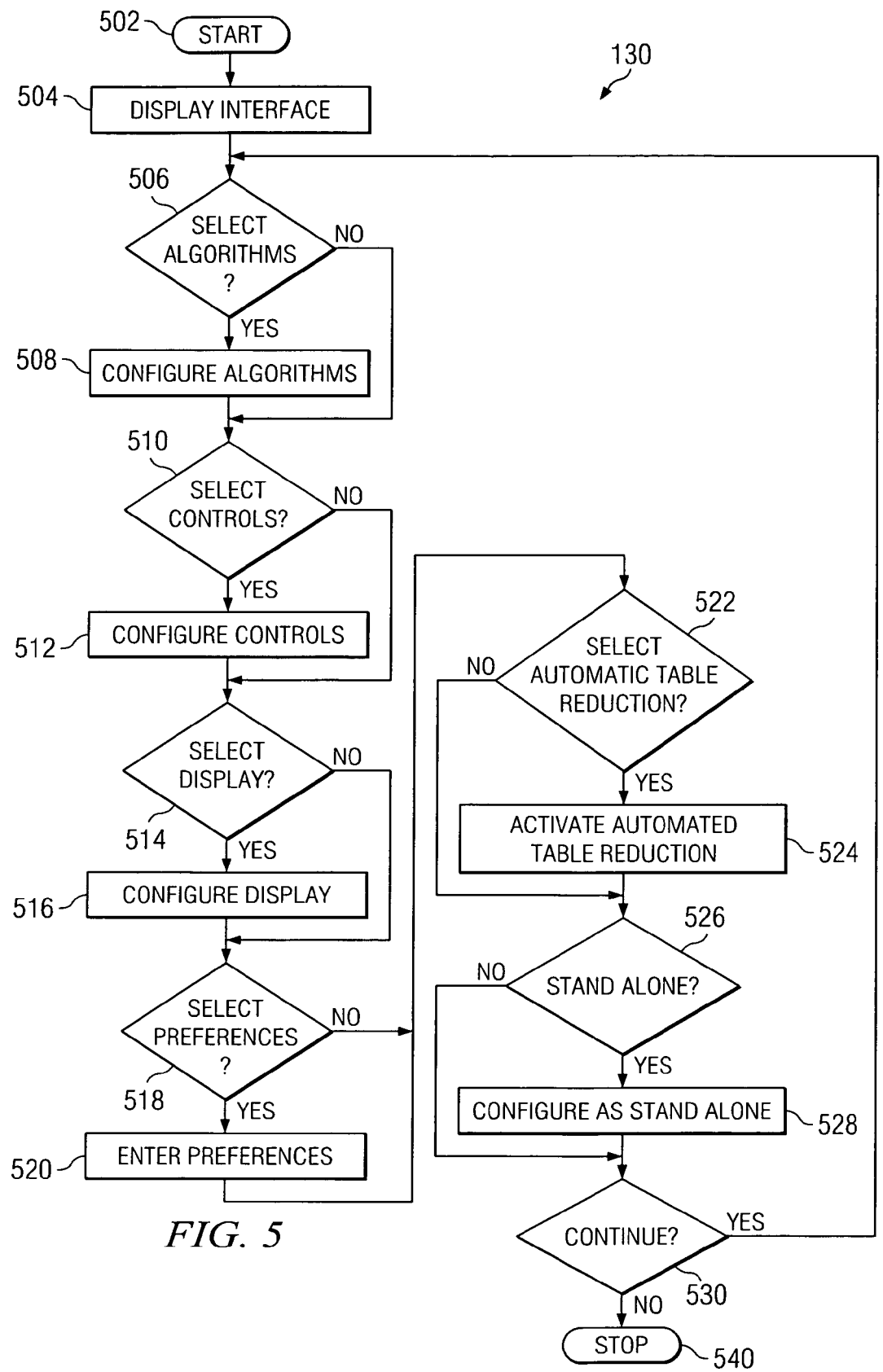
FIG. 5 is a flowchart of the Configuration Program (CP).

FIG. 5 is a flowchart of Configuration Program (CP) 130. CP 130 begins (502) and displays the user interface (504). CP 130 determines whether the user wants to select algorithms (506). If the user wants to select algorithms, then the user selects from available options. For example, one algorithm loads the hideable data (determined by MP 120) into a Java String array so that hiding will be based on the header fields in the array list. Another algorithm translates the table data into an extensible markup language (XML) format so that an XML parser can be applied to hide the data. Another algorithm translates the table data into an extensible style sheet language (XSL) so that an XSL parser can be applied to hide the data.

CP 130 determines whether the user selects controls (510). If so, CP 130 prompts the user to configure the controls (512). The user may configure the manner in which a particular table reduction parameter is selected. The user may choose an icon displayed at a column or row, or choose table reduction parameters available from a control panel. The user may configure the manner in which a particular table reduction parameter is selected by choosing a verbal description such as "hide column" or "unhide column." The user may choose to save settings between sessions or pages by maintaining the same page by configuring a "remember page options" setting. For example, the user may configure the manner in which the user would select table reduction by choosing from an item in the context menu, in the browser's regular menu, in a dedicated toolbar, or in a dedicated control panel.

CP 130 determines whether the user wants to select display (514). If so, CP 130 prompts the user to configure the display (516). For example, the user may configure CP 130 to provide a display within the browser display. Alternatively, the user may configure CP 130 to provide a display in an area separate from the browser display. Additionally, the user may elect to have a small preview display in a separate panel showing what the reduced table looks like so that the user can determine if the display is satisfactory. The user can then apply the configuration when the preview screen shows the table reduced to a desirable size.

CP 130 determines whether the user wants to select preferences (518). If so, the user is prompted to make selections regarding preferences (520). A wide variety of preferences may be available to the user. The user may choose to apply persistent settings to all pages on the same site. The user may choose to apply predictive heading names where the user typically wants to remove columns that have a <th> tag or a top row's <td> tag with a certain value. For example, the user may want to hide the column containing values with the heading "Weight." Moreover, the user could include a word, such as weight, in a list that will automatically hide the column should the word appear on any site. The user could choose to allow a larger number number of contiguous rows or cells to be displayed before an option to hide the rows or cells is offered.

The user may configure MP 120 to maintain a copy of the latest hidden dataset in memory so that if the user wants to update at later time, MP 120 may use the prior table without having to repeat the analysis and insertion of controls. The user may configure MP 120 to provide a preview display. The preview display may be activated by a preview button. When activated, the preview button brings up a second window so that a user configurable number of rows with columns may be seen showing what the reduced table will look like. For example, such a panel may appear in the upper left hand corner of the display.

If not, a determination is made as to whether the user wants to select automatic table reduction (522). If so, the user is prompted to activate automatic table reduction (524).

CP 130 determines whether the developer wants to make the invention a stand alone application (526). If so, the invention is configured as a stand alone application (528). The invention may be configured as a stand alone application by acting as a personal proxy server for all incoming HTML code that passes through MP 120 and which is then modified before sending to the browser. The invention becomes a personal proxy server by setting the browser proxy settings to "localhost (127.0.0.1) with the port of MP 120, such as 8080. Then, when a page is initially requested by the user from the browser, MP 120 receives HTTP headers from the browser on port 8080, sends the request to the web site on port 80, receives the HTML on port 80, examines the HTML, analyzes the HTML, and inserts controls as necessary, and then sends the resulting page to the browser on port 8080. When the user clicks a column or row to hide, the request goes to MP 120 on port 8080. Now, when MP 120 examines the headers, they do not include going to a web site, and so all MP 120 has to do is re-examine what it already has in cache, and send the HTML back to the browser.

A determination is made as to whether the user wants to continue (530). If so, CP 130 goes to step 506. If not, CP 130 ends (540). Persons skilled in the art will be aware that a control panel may store user preferences as a global preset.

Additional embodiments of the table reduction program may be employed. A user may highlight a table on a web page. The table reduction program will parse the HTML code and determine which table was selected. Based on the configuration, a selectable item may appear such as a button, menu, or new window. The user may list out all of the table headers. The user may select the preferred column or row dataset to display using a text filter or a column or row number. The user may highlight the categorized data set. The table reduction program will then apply the user preference entered in the configuration program and dynamically update the selected table to only show the desired data set An additional embodiment of the table reduction program may be implemented by updating the code with the undesirable data set column or row commented out in the code.

Additional embodiments of the modification program may be employed. HTML code may be injected into the page to add a cascading style sheet. HTML code may be injected into the page to add class attributes to the cell tags. Additional HTML code may create clickable icons that perform the hide and unhide functions.

Additional embodiments of the configuration program may be employed. A pop-up wizard may be used in conjunction with the configuration program. A screen reader interface may be employed for visually impaired users. Icons may be injected by the program that perform the hide and unhide function. A column or row may be hidden using a right-clickable context menu. The user may choose to hide every "n" number of rows, such as a repeated header row that the user does not want to see. The user may enable or disable automatic row markup.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for reducing the display size of a table, rendered in a web page, comprising:
    receiving the web page, having the table, at a web browser application being run on specifically a client computer connected to the Internet;
    identifying a table structure tag in a hyper text markup language in the web page, the table structure tag being for a column or a row in a table;
    determining whether the table structure tag meets a criteria for being hideable;
    responsive to determining that the table structure tag meets the criteria for being hideable, adding a control into the table structure tag, before the table is rendered by the web browser application being run on specifically the client computer;
    linking the control to an algorithm; and
    activating the control so that the algorithm causes the column or the row to not be rendered when the table is displayed on the web page;
    wherein the display size of the table on the web page is reduced by not rendering the column or row in response to the control and the algorithm.

2. A system for reducing the display size of a table rendered in a web page, the system comprising:
    a client computer connected to the Internet, the computer having a processor connected to a computer readable memory and to a computer readable tangible storage device;
    first program instructions to receive the web page, having the table at a web browser application being run on specifically the client computer connected to the Internet;
    second program instructions to identify a table structure tag in a hyper text markup language in the web page, the table structure tag being for a column or a row in a table;
    third program instructions to determine whether the table structure tag meets a criteria for being hideable;
    fourth program instructions to add, responsive to determining that the table structure tag meets the criteria for being hideable, a control into the table structure tag before the table is rendered by the web browser application being run on specifically the client computer;
    fifth program instructions to link the control to an algorithm; and
    sixth program instructions to activate the control so that the algorithm causes the column or the row to not be rendered when the table is displayed on the web page;
    wherein the display size of the table on the web page is reduced by not rendering the column or row in response to the control and the algorithm; and
    wherein the first throught the sixth program instructions are stored in the computer readable tangible storage device for running on the processor via the computer readable memory.

3. A computer program product for reducing the display size of a table rendered in a web page, the computer program product comprising:
    a computer readable tangible storage device;
    first program instructions to receive the web page, having the table, at a web browser application being run on specifically a client computer connected to the Internet;
    second program instructions to identify a table structure tag in a hyper text markup language in the web page, the table structure tag being for a column or a row in a table;
    third program instructions to determine whether the table structure tag meets a criteria for being hideable;
    fourth program instructions to add responsive to determining that the table structure tag meets the criteria for being hideable, a control into the table structure tag, before the table is rendered by the web browser application being run on specifically the client computer;
    fifth program instructions to link the control to an algorithm; and
    sixth program instructions to activate the control so that the algorithm causes the column or the row to not be rendered when the table is displayed on the web page;
    wherein the display size of the table on the web page is reduced by not rendering the column or row in response to the control and the algorithm; and
    wherein the first through the sixth program instructions are stored in the computer readable tangible storage device.

* * * * *